Feb. 19, 1952   J. M. ANDREAS   2,586,286
FILM REGISTERING AND PRINTING APPARATUS
Filed April 3, 1948

Inventor
John M. Andreas
by Roberts, Cushman & Grover
Atty

Patented Feb. 19, 1952

2,586,286

UNITED STATES PATENT OFFICE 2,586,286

FILM REGISTERING AND PRINTING APPARATUS

John M. Andreas, Pasadena, Calif., assignor to Technicolor Motion Picture Corporation, Hollywood, Calif., a corporation of California Application April 3, 1948, Serial No. 18,759

9 Claims. (Cl. 95—75)

In many branches of the art of cinematography it is desirable to hold two films in intimate face-to-face contact, usually front-to-front but sometimes front-to-back or back-to-back, while the films are traveling in superposition along a predetermined path. Typical examples comprise light printing, imbibition printing, and transferring an emulsion layer from one film base to another. Heretofore this has usually been accomplished by locking the two films together with register teeth carried by a flexible belt or rigid wheel. However, the register teeth tend to injure the films, especially if the films are traveling at high speed and if there is a disparity between the pitch of the teeth and the pitch of the perforations in the film.

Objects of the present invention are to superimpose films and hold them in perfect face-to-face contact with each other without the use of register pins simultaneously passing through the perforations of both films during all or part of the length of their common path of travel, to permit the placing of the two films in any desired lateral position relative to each other without regard to the alignment of their perforations, to attain high speed operation without damage to the films, to contact films of normal pitch with films which are more or less shrunken, and generally to improve the art of film printing.

The present invention involves the combination of a smooth drum around which two films may be fed in superposition along an arc which is many times as long as the width of the film and in which one film is printed from the other, together with feed-on sprocket wheels meshing with the films before the films reach the drum and take-off sprocket wheels meshing with the films after they leave the drum respectively, and means for driving certain of the wheels at the required speed whereby the films may be correctly positioned and held in intimate contact with each other while traversing the aforesaid arc, without locking the films together with register pins. The drum may comprise a narrow-faced wheel with the aforesaid arc extending through less than 360°, or it may comprise a long cylinder with the film wrapped around the cylinder in a helical path whose length is greater than 360°. The drum is preferably journaled to rotate about its axis, but by employing anti-friction means to support the films (as disclosed for example in application Sr. No. 674,557, filed June 5, 1946, now Patent No. 2,561,497, issued July 24, 1951) a stationary drum may be used. During steady-state operation of the machine, the films will be moving in such a way that equal numbers of perforations pass each point in the film paths in equal intervals of time. Preferably, the sprockets will be mechanically interlocked so that they all turn together at the desired tooth speed. If the drum is power driven, its speed of rotation may be adjusted so that the average perforation speed of the films traveling over the drum is the same as the perforation speed of the films as they travel over the sprockets. Any free-turning pulleys or spools used to support the film path will be turned by the film they support and their speed of rotation does not require any special control or attention.

In a secondary aspect of the invention, loops are provided in one or both film paths between the drum and the feed-on or take-off sprockets. If a film path has loops on both sides of the drum, the tendency of the film to slip along the curved surface of the drum can be minimized by applying approximately equal tensions to both loops. If one of the films is shrunken more than the other, it may be stretched by increasing the tension in the loop between its feed-on sprocket and the drum or by using a seating roller of small diameter or both. While the two films may be placed on the drum by passing them under the same seating roller, preferably they are seated separately. This permits each film to be independently guided to the desired location on the drum, permits the curvature of each film at the seating point to be adjusted to the optimum condition, and permits the use of any desired seating pressure at the time each film is placed in position for printing. When one film has a shorter pitch than the other, the seating roller for the shrunken film will preferably have a smaller radius than the seating roller for the normal film, thus the surface of the shrunken film facing the drum is stretched by bending the film as it is being seated, without placing any strain on the perforations. The stretching of a shunken film may also be accomplished or augmented by providing a brake for its seating roller.

In another specific aspect of the invention certain of the aforesaid sprockets are arranged in tandem with a film loop between them, with a pulley in the loop, and with a force acting on the pulley so that the tension in the film of the loop is intermediate between the tensions in the film beyond the two sprockets. In this way the strain on the sprocket holes of the film may be reduced by dividing the load between two sprockets.

While the present invention has many uses, it is particularly adapted to sound-track printing. For the purpose of illustration a typical embodiment of the invention is shown in the accompanying drawings in which Fig. 1 is a diagram of the preferred embodiment;

Figure 1:
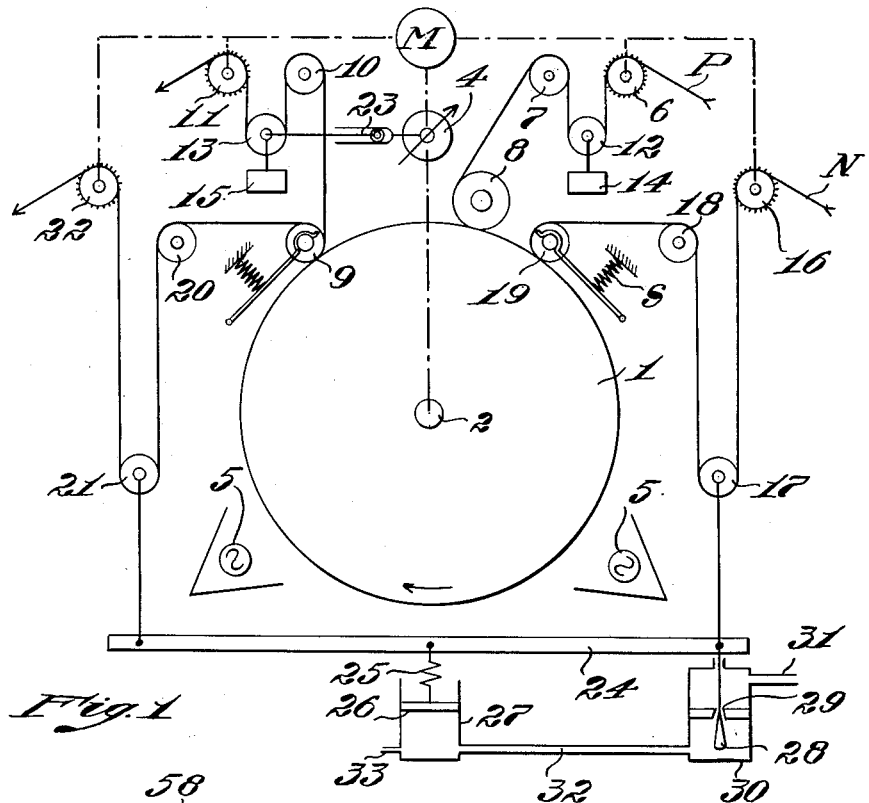

The particular embodiment of the invention chosen for the purpose of illustration comprises a rotating drum 1 having a shaft 2 driven by a motor M through a variable-speed power transmission 4. Films N and P are fed to the drum in superposition. The film N may comprise a negative and the film P may comprise a positive stock upon which positive images are to be printed from the negative N, in which case the film N would ordinarily have a somewhat shorter pitch than the film P due to the shrinkage of the film N incident to the development of the images thereon. Lights 5 are mounted outside the drum to print the film P.

The film P is fed over a feed-on sprocket 6, a spool 7, a seating roller 8 where the film is seated snugly on the drum, thence around the drum to the stripping roller 9, thence to the spool 10, thence to the take-off sprocket 11. Intermediate between the wheels 6 and 7, and the wheels 10 and 11, the film loops under the floating pulleys 12 and 13 which carry weights 14 and 15 to hold the film taut, accommodate slight variations in the speed of the film P traveling over the drum 1 relative to its speed over the sprockets 6 and 11, and accommodate variations in the length of the film path from the sprocket 6 to the sprocket 11 resulting from variations in the pitch of the film P. This sort of accommodation is essential as the pitch of a roll of film is somewhat variable and unpredictable due to unequal shrinkage between the inside and the outside of the roll, furthermore the pitch of a roll of film tends to decrease slowly with age as solvents and plasticizers evaporate from the film base.

The film N is fed over a sprocket 16, under a floating pulley 17, over a spool 18, around a seating roller 19, thence around the drum to the stripping roller 9, thence over spool 20, and under floating pulley 21 to the take-off sprocket 22. To control the stretching effect of pulleys 12 and 13, the tension in the film loops may be augmented by attaching suitable weights to the pulleys as at 14 and 15, and by spring loading at least one of the pulleys so as to provide a continuously-acting, self-adjusting, variable-tension device (as described below in connection with Fig. 2).

Each of the four sprocket wheels 6, 11, 16 and 22 is positively driven from the motor M so that they all turn at the same tooth speed and remain interlocked through all conditions of shutdown, starting, running and stopping. The variable speed drive 4 is controlled by the floating pulley 13 as indicated at 23. If the drum is rotating too fast the pulley 13 will be moving downward, thereby adjusting the variable-speed drive in such a way as to reduce the speed of the drum; if the drum is rotating too slowly the pulley 13 will be rising, thereby increasing the speed of the drum until the film is traveling at uniform perforation speed in all parts of the machine, that is with the same number of perforations passing all points in the film paths in each unit of time.

The mechanical means used for driving the sprockets and drum from the motor will be selected and adjusted so as to obtain smooth, steady motion with a minimum of hunting or backlash for all operating conditions.

As shown in Fig. 1 the seating roller 19 for the negative film is preferably smaller in diameter than the seating roller 8 for the positive film, whereby the negative film is stretched more than the positive film as it passes under its seating roller. This compensates in part for the fact that the film traveling the outside path on the drum must travel a greater distance and must be stretched more than the film traveling the inside path.

The tendency of one film to slip on the other while traveling around the drum may be counteracted by pressing the seating and stripping rollers tightly against the drum. Thus in Fig. 1 the rollers 9 and 19 may be forced against the drum by means of springs acting on the trunnions of the rollers.

One way to insure equal tensions in film loops 17 and 21 while at the same time providing continuous, automatic, self-adjustment of the machine to accommodate variations in the pitch of one film relative to the other is provided by the addition of the following mechanism. Suspended from pulleys 17 and 21 is a bar 24. Suspended from the middle of the bar through the medium of a spring 25 is a heavy piston 26 operating in a cylinder 27. Attached to the right-hand end of the bar is a valve 28 closing against a valve seat 29 in the chamber 30 having an inlet 31 connected to a source of pressure such as compressed air. The chamber 30 communicates with the cylinder 27 through a duct 32 and the cylinder 27 has a restricted outlet 33 through which the compressed air can escape slowly. The parts are so proportioned that the downward forces acting on the two pulleys 17 and 21 are always equal.

When the machine is threaded, the film loops carrying the pulleys 12, 13, 17 and 21 are adjusted to a convenient size corresponding to their normal operating positions. As long as the film perforations mesh perfectly with the sprockets, the number of perforations from sprocket 6 to sprocket 11 and the number of perforations from sprocket 16 to sprocket 22 will remain the same as at the time of threading, regardless of the pitch of the films or the running of the machine. Any tendency for the drum to turn too fast so that loop 13 gains in size at the expense of loop 12 will be corrected by the linkage 23 acting on the variable-speed drive 4. If the film N has a very short pitch so that loop 17 starts to decrease in size while loop 21 grows larger (due to a greater number of perforations in the shrunken film N traveling over the drum than in the normal film P) the bar 24 will fall on the left and rise on the right, partially closing the valve 28, decreasing the amount of air that enters the chamber 30 but not greatly decreasing the amount of air that is flowing out of the cylinder 33, thereby reducing the pressure supporting the heavy piston 26, allowing the piston to fall to a lower position, increasing the tension in the spring 25, and thus increasing the tension in both film loops 17 and 21 equally until the shrunken film is being stretched to such a pitch that both films travel around the drum at the same perforation speed. If the tension in loops 17 and 21 is too great so that the film N has a longer pitch than film P while they travel around the drum, the action of the automatic tension control will be reversed and a new equilibrium will be reached in which each film is stretched just enough to permit its traveling over the drum in perfect contact with the other film and at the same perforation speed.

Figure 2:
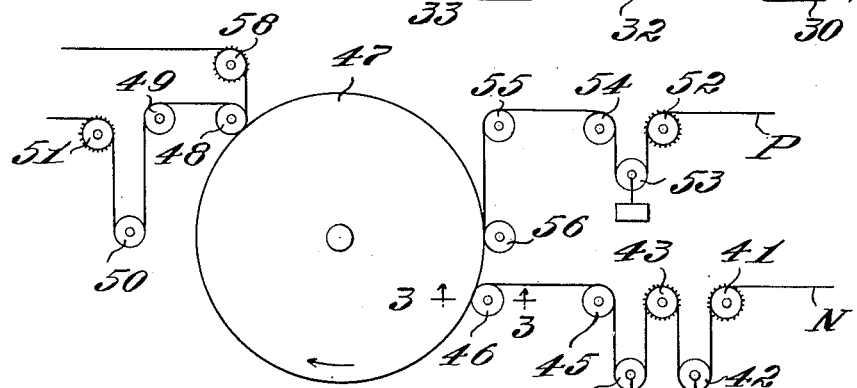
Fig. 2 is a diagram showing a modification.

In the modification shown in Fig. 2 the negative film N is fed over a sprocket 41, under a weighted pulley 42, over another sprocket 43, under a spring-loaded pulley 44, over a spool 45, under seating roller 46, around the drum 47, under the stripping roller 48, over the spool 49, under pulley 50, and over the sprocket 51. The positive film P is fed over the sprocket 52, under weighted pulley 53, over spools 54 and 55, under seating roller 56, around the drum 47, under stripping roller 48 and thence over the sprocket 58. All of the sprockets are interlocked and driven at the same tooth speed from the motor supplying motive power to the entire machine. The tension in the ongoing negative film is automatically adjusted by the film itself while the machine is in operation.

Figure 3:
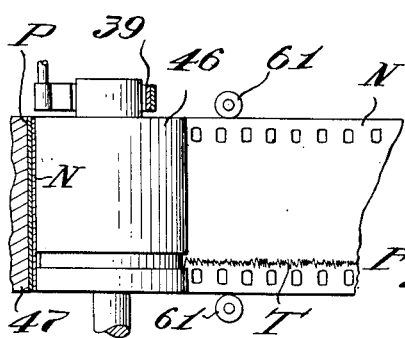
Fig. 3 is a section on line 3—3 of Fig. 2.

Approximate preliminary adjustment of the tension in loop 44 is made by adjusting the size of loops 44 and 59 at the time the machine is threaded, and by adjusting the position of the lower end of the spring 59 with the adjusting screw 60. After threading and rough adjustment, the machine is set in motion. If the film N is of such short pitch that the initial tension in loop 44 is insufficient to stretch the film to the required extent, loop 59 will grow longer and loop 44 will grow shorter, thus stretching the spring and increasing the tension in the ongoing film N until the desired equilibrium is reached. The machine will then operate at steady state with loops of constant size and constant spring tension while the two films travel around the drum in unison at the same perforation speed. If a new roll of film N having a longer pitch is now fed into the machine, the machine will automatically readjust itself to the new condition by decreasing the size of loop 59, increasing the size of loop 44, decreasing the spring tension on the ongoing film and again reaching a steady equilibrium. Instead of feeding the positive film P to the drum along a curved path, it is fed to the drum along a straight path tangential to the drum. This reduces the stretching of the longer pitch film P so that the shorter pitch film need not be stretched so much in order to make both travel around the drum at the same perforation speed. To increase the stretching action on the film N by the seating roller 46, the roller may be provided with an adjustable brake as indicated at 39 in Fig. 3. As shown in the same figure, the seating rollers and stripping rollers for a sound track printer will preferably be undercut in the area corresponding to the image area on the film to prevent scratching or abrading the film surface.

The tendency of a sprocket to tear the perforations of the film, when the tension on one side of the sprocket is much greater than the tension on the other side, can be greatly reduced by providing tandem sprockets as shown at 41 and 43. The weight on the loop between the two sprockets is adjusted so as to make the tension on the film between the sprockets approximately equal to the average of the tensions outside the two sprockets.

The edges of the films may be guided in any suitable manner. For example the sprockets and seating rollers may have the usual flanges, or guide rollers may bear on one or both edges of a film as it approaches the drum, as shown at 61 in Fig. 3. Since the films are not positioned by pins or teeth passing concurrently through the perforations of both films, the films may be guided onto the drum in any desired lateral relationship, irrespective of whether or not this causes the edges of the films or their perforations to be in line. With this type of a machine two films of dissimilar width can be printed together, or two films of the same width can be offset so that, for example, a negative having a sound track along one side of the film might be used to make a print having the sound track along the center line of the film.

Ordinarily the arc of contact between the two films on the drum will be at least twenty times the width of the film and it may be as much as two thousand times the width of the film in the case of a drum supporting a helical film path. No pins or other mechanical means are used to lock the two films together while they are traveling in superposition. At no time do the teeth of a sprocket wheel or other film-positioning device engage the perforations of both films at once. The pitch of the negative is automatically and continuously adjusted as the negative is placed in contact with the positive by adjusting its tension and thereby stretching it to the proper degree. Preferably, the positive stock (which has the longer pitch) runs through the machine at constant and minimum tension. The drum is power driven through an automatically-adjusted, variable-speed drive so as to provide uniform and strain-free motion of the films through the machine under all conditions of starting, running, and stopping. The tension on the offgoing negative loop is preferably maintained approximately equal to the variable tension in the ongoing negative loop, thus eliminating any tendency of the films to cinch or slide on each other while on the drum. Inasmuch as the films are held in contact throughout a long arc, the machine is particularly adapted to printing on slow-speed stock. The amount of exposure may be varied by changing the speed of the machine as a whole or by cutting off part of the light with a shutter.

It should be understood that the present disclosure is for the purpose of illustration only and that this invention includes all modifications and equivalents which fall within the scope of the appended claims. Any of the features of the first embodiment illustrated in Fig. 1 may be used in the second embodiment illustrated in Figs. 2 and 3 and vice versa. For example any of the stretching rollers, such as 17 and 44, may be weight loaded or spring loaded or both.

I claim:

1. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, the paths of one film between the drum and its adjacent feed-on and take-off sprockets being longer than the distances between the drum and sprockets respectively to provide loops therebetween, and means for maintaining in said two loops approximately equal tensions to stretch the film substantially to the same pitch as the other film.

2. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, and a movable loaded guide pressing on one of the films transversely of its path, in a portion of its path where the film is free to move transversely for stretching a shrunken film as it goes on the drum until its pitch is substantially equal to that of the other film.

3. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, a roller spaced from the drum a distance approximately equal to the thickness of one film for seating the film on the drum at one location, and another roller spaced from the drum a distance approximately equal to the thickness of both films for seating the second film on the first film at a location beyond said location, and means for maintaining the arc of contact between the second roller and second film constant and continuously stretching the second film as it feeds to the second roller, whereby when the second film reaches the drum its pitch is substantially equal to that of the first film.

4. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, means for seating the films on the drum one over the other, one of said seating means comprising a roller which presses the film against the drum, the path of the film including a substantial arc of the roller, and the radius of the roller being small enough to stretch the film appreciably while it is being seated against the drum, and means for maintaining the arc of contact between film and roller constant and continuously stretching the film as it feeds to the roller, whereby when the second film reaches the drum its pitch is substantially equal to that of the first film.

5. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, means for seating the films on the drum one over the other, one of said seating means comprising a roller which presses the film against the drum, and a brake for said seating roller, whereby the films may be placed in intimate contact with each other and made to travel around the drum at the same perforation speed without the use of register pins to lock the films together.

6. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, means for seating the films on the drum one over the other, one of said seating means comprising a roller which presses the film against the drum, the path of the film including a substantial arc of the roller and the radius of the roller being small enough to stretch the film appreciably while it is being seated on the drum, and a brake for said roller, whereby the films may be placed in intimate contact with each other and made to travel around the drum at the same perforation speed without the use of register pins to lock the films together.

7. In the art of printing cinematographic film, the combination of a smooth drum about which two films may be fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, certain of said sprockets being arranged in tandem with a film loop therebetween, a pulley in said loop, and means for applying to the pulley a force such that the tension in the film loop will be approximately intermediate between the tensions in the film outside the tandem pair of sprockets, whereby the strain on the perforations of the film is reduced by the use of a tandem pair of sprockets engaging twice as many film perforations as would have been engaged by a single sprocket, the films being placed in intimate contact with each other and made to travel around the drum at the same perforation speed without the use of register pins to lock the films together.

8. In the art of printing cinematographic film, the combination of a smooth drum about which two films are fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, and means for automatic continuous-adjustment of the tension on one of the films as it is seated on the drum, said last means comprising a loaded guide pressing transversely on the shorter film as the film approaches the drum, whereby its pitch is increased by the amount required to make both films travel around the drum at substantially the same perforation speed, the films being tightly wrapped against each other and against the drum so as to remain in perfect contact during printing without the use of register pins to lock the films together.

9. In the art of printing cinematographic film with light, the combination of a smooth drum about which two films are fed in superposition throughout an arc which is many times as long as the width of the film and in which one film is printed from the other, means guiding the films to and from the drum at the opposite ends of said arc, feed-on sprockets meshing with the films before they reach the drum and take-off sprockets meshing with the films after the films leave the drum respectively, means for driving the sprockets in unison such that they turn at the same tooth speed, and means for driving the drum at the same average speed as said sprockets, said last means comprising a variable speed drive having a speed controller pressing on one of the films transversely of its path, in a portion of its path where transverse movement is not obstructed, whereby the exposure may be adjusted by varying the average speed of the machine as a whole while permitting slight variations in the speed of the drum relative to the speed of the sprockets.

JOHN M. ANDREAS.

REFERENCES CITED

The following references are of record in the file of this patent:

UNITED STATES PATENTS

| Number | Name | Date |
| --- | --- | --- |
| 1,223,447 | Thornton | Apr. 24, 1917 |
| 1,717,957 | Brandenberger | June 18, 1929 |
| 1,783,045 | Kellogg | Nov. 25, 1930 |
| 1,901,645 | Heine et al. | Mar. 14, 1933 |
| 2,023,649 | Six et al. | Dec. 10, 1935 |
| 2,398,639 | Heyer | Apr. 16, 1946 |

FOREIGN PATENTS

| Number | Country | Date |
| --- | --- | --- |
| 781,892 | France | Mar. 14, 1935 |
| 483,014 | Great Britain | Apr. 8, 1938 |
| 840,174 | France | Jan. 11, 1939 |